(12) United States Patent
Parag et al.

(10) Patent No.: US 9,710,884 B2
(45) Date of Patent: *Jul. 18, 2017

(54) FLEXIBLE CONTROL IN RESIZING OF VISUAL DISPLAYS

(71) Applicant: International Business Machines Corporation, Armonk, NY (US)

(72) Inventors: Nadav Parag, Rehovot (IL); Vladimir Shalikashvili, Petah Tiqwa (IL); Moshe Weiss, Petah Tiqwa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/370,050

(22) Filed: Dec. 6, 2016

(65) Prior Publication Data

US 2017/0084003 A1    Mar. 23, 2017

Related U.S. Application Data

(63) Continuation of application No. 15/130,327, filed on Apr. 15, 2016, now Pat. No. 9,535,890, which is a (Continued)

(51) Int. Cl.
*G06K 9/32* (2006.01)
*G06T 3/40* (2006.01)
*G06F 3/0488* (2013.01)
*G06F 3/0484* (2013.01)
*G06F 17/22* (2006.01)

(52) U.S. Cl.
CPC .............. *G06T 3/40* (2013.01); *G06F 3/0488* (2013.01); *G06F 3/04845* (2013.01); *G06F 17/2247* (2013.01)

(58) Field of Classification Search
None
See application file for complete search history.

(56) References Cited

U.S. PATENT DOCUMENTS 5,263,134 A    11/1993   Paal et al.
5,751,283 A    5/1998    Smith
(Continued)

OTHER PUBLICATIONS

Maaloe et al., "A Platform-Independent Framework for Application Development for Smart Phones", Kamili, Department of Informatics and Mathematical Modeling, Jul. 2011. Lyngby, Denmark. 58 pages.

(Continued)

*Primary Examiner* — Jayesh A Patel
(74) *Attorney, Agent, or Firm* — Stosch Sabo

(57) ABSTRACT

A computer processor circuit can be used to receive a resizing request that includes parameters for resizing a user interface containing a plurality of visual elements. In response to the request, the computer processor circuit can access a set of one or more data files specifying: links to binary image data files for the plurality of visual elements; a set of nodes forming a plurality of vector paths for at least one of the plurality of visual elements; and a set of rules defining different image resizing properties for different vector paths of the plurality of vector paths. The computer processor circuit can then create a resized version of the user interface by modifying the plurality of visual elements according to the set of rules and to the parameters for resizing.

1 Claim, 6 Drawing Sheets

Related U.S. Application Data continuation of application No. 14/291,081, filed on May 30, 2014.

(56) References Cited

U.S. PATENT DOCUMENTS

| | | | |
|---|---|---|---|
| 5,796,401 A | 8/1998 | Winer | |
| 6,329,994 B1 | 12/2001 | Gever et al. | |
| 6,603,493 B1 | 8/2003 | Lovell et al. | |
| 7,409,569 B2 | 8/2008 | Illowsky et al. | |
| 7,549,127 B2 * | 6/2009 | Chasen | G06F 9/4443 |
| | | | 715/788 |
| 7,590,947 B1 * | 9/2009 | Gay | G06F 3/0483 |
| | | | 715/798 |
| 7,624,403 B2 | 11/2009 | Ishimitsu et al. | |
| 7,689,908 B2 | 3/2010 | Yan et al. | |
| 7,747,782 B2 | 6/2010 | Hunt et al. | |
| 8,260,365 B1 * | 9/2012 | Kessenger | H04M 1/72563 |
| | | | 455/566 |
| 8,352,856 B2 * | 1/2013 | Fillion | G06F 17/211 |
| | | | 382/173 |
| 9,535,890 B2 | 1/2017 | Parag et al. | |
| 9,552,339 B1 * | 1/2017 | Kessenger | H04M 1/72563 |
| 2002/0069218 A1 | 6/2002 | Sull et al. | |
| 2002/0120653 A1 | 8/2002 | Kraft et al. | |
| 2004/0187136 A1 | 9/2004 | Bhogal et al. | |
| 2004/0263537 A1 | 12/2004 | Faraday et al. | |
| 2005/0289018 A1 | 12/2005 | Sullivan et al. | |
| 2006/0150082 A1 | 7/2006 | Raiyani et al. | |
| 2008/0001961 A1 | 1/2008 | Roimela et al. | |
| 2008/0295004 A1 | 11/2008 | Coca et al. | |
| 2010/0030578 A1 | 2/2010 | Siddique et al. | |
| 2010/0235767 A1 | 9/2010 | Hammack et al. | |
| 2011/0276863 A1 * | 11/2011 | Bhise | G06F 17/30905 |
| | | | 715/201 |
| 2013/0007698 A1 | 1/2013 | Warila et al. | |
| 2013/0198609 A1 | 8/2013 | Mokhtarzada et al. | |
| 2014/0096040 A1 * | 4/2014 | Grosz | G06F 3/0484 |
| | | | 715/753 |
| 2014/0215388 A1 | 7/2014 | Park-Ekecs et al. | |
| 2015/0346954 A1 | 12/2015 | Parag et al. | |
| 2016/0048307 A1 * | 2/2016 | Troyer | G06F 9/4448 |
| | | | 715/801 |
| 2016/0217110 A1 | 7/2016 | Parag et al. | |

OTHER PUBLICATIONS

List of IBM Patents or Patent Applications Treated as Related, Dec. 1, 2016. 2 pages.

U.S. Appl. No. 15/370,011, Accelerated Examination Search Document, Nov. 10, 2016. 37 pages.

U.S. Appl. No. 15/130,327, Accelerated Examination Search Document, Apr. 7, 2016. 16 pages.

* cited by examiner

FLEXIBLE CONTROL IN RESIZING OF VISUAL DISPLAYS

CROSS-REFERENCE TO RELATED APPLICATIONS

The subject application is a continuation of application Ser. No. 15/130,327 (U.S. Pat. No. 9,535,890) filed on Apr. 15, 2016 which is a continuation of application Ser. No. 14/291,081 filed on May 30, 2014.

BACKGROUND

The present disclosure relates to resizing visual displays, and more specifically, to resizing that uses a data file that specifies resizing parameters according to rendering layers.

Visual displays for websites or graphical user interfaces (GUIs) can be viewed using a variety of different devices and screens. The design and development of websites or GUIs can be complicated if the designer is trying to keep up with the multitude of currently available and soon-to-be-added screen resolutions and sizes for various different devices. Depending upon the resources available, creating and updating a visual display that renders nicely for each resolution and new device may be impractical and may require continual updating to keep up with new screen sizes, resolutions, and corresponding devices.

SUMMARY

Embodiments of the present disclosure are directed toward a computer implemented method in which a computer processor circuit can be used to receive a resizing request that includes parameters for resizing a user interface containing a plurality of visual elements. In response to the request, the computer processor circuit can access a set of one or more data files specifying: links to binary image data files for the plurality of visual elements; a set of nodes forming a plurality of vector paths for at least one of the plurality of visual elements; and a set of rules defining different image resizing properties for different vector paths of the plurality of vector paths. The computer processor circuit can then create a resized version of the user interface by modifying the plurality of visual elements according to the set of rules and to the parameters for resizing.

According to embodiments, a system can be provided for resizing visual displays. The system can include one or more computer processor circuits that are configured to receive a resizing request that includes parameters for resizing a user interface containing a plurality of visual elements and to access, in response to the request, a set of one or more data files. The data files can specify links to binary image data files for the plurality of visual elements, a set of nodes forming a plurality of vector paths for at least one of the plurality of visual elements, and a set of rules defining different image resizing properties for different vector paths of the plurality of vector paths. The computer processor circuits can be configured to create a resized version of the user interface by modifying the plurality of visual elements according to the set of rules and to the parameters for resizing.

Embodiments are directed toward, a computer program product for creating a resized version of a user interface, the computer program product comprising a computer readable storage medium having program instructions embodied therewith, the program instructions readable by a processor circuit to cause the processor circuit to: receive a resizing request that includes parameters for resizing a user interface containing a plurality of visual elements; access, in response to the request, a set of one or more data files. The set of data files can specify links to binary image data files for the plurality of visual elements, a set of nodes forming a plurality of vector paths for at least one of the plurality of visual elements, and a set of rules defining different image resizing properties for different vector paths of the plurality of vector paths. The process circuit can also create a resized version of the user interface by modifying the plurality of visual elements according to the set of rules and to the parameters for resizing.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
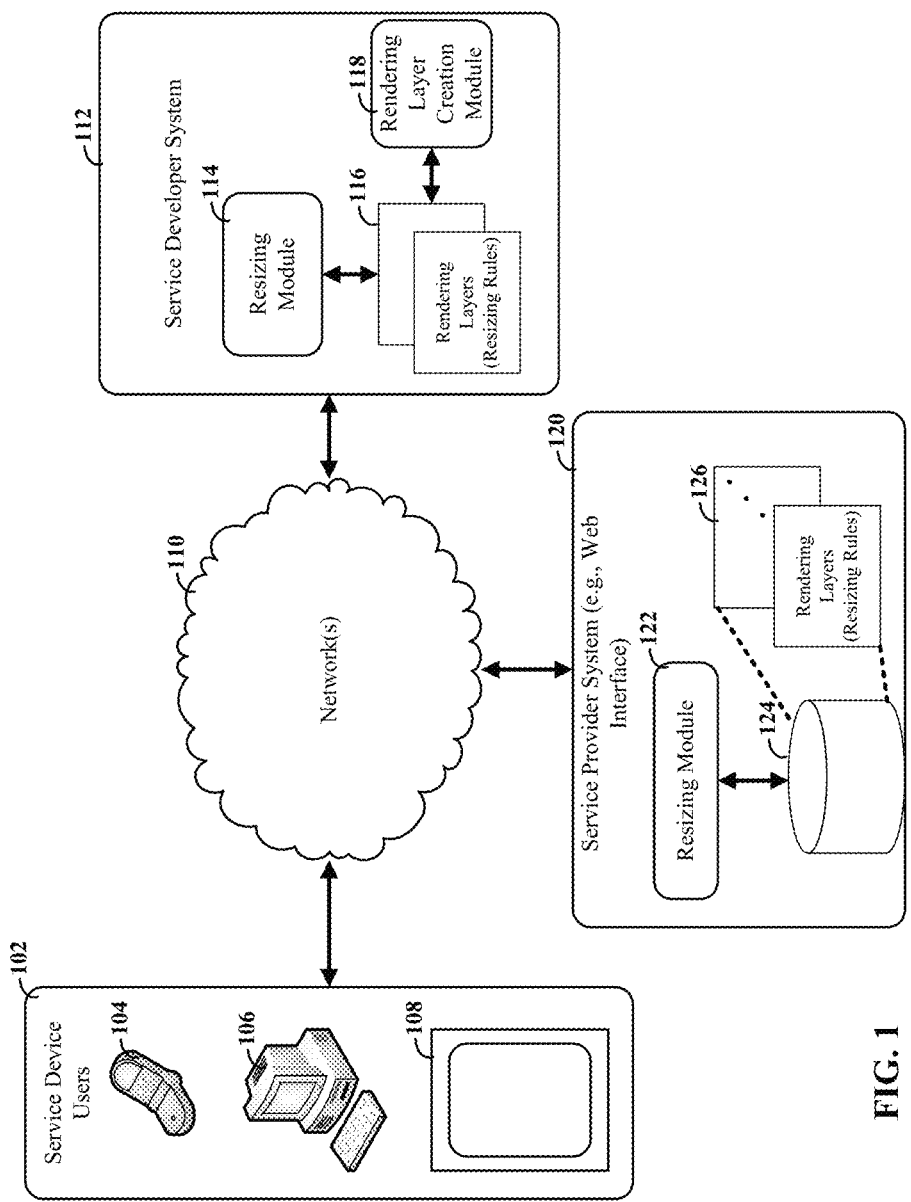
FIG. 1 depicts a block diagram for a system that provides resizing functions for visual displays associated with one or more services, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to resizing visual displays, more particular aspects relate to the use of a hierarchical set of rendering layers that can be designed to facilitate resizing. While the present disclosure is not necessarily limited to such applications, various aspects of the disclosure may be appreciated through a discussion of various examples using this context.

Various embodiments of the present disclosure are directed toward a computer system that is configured to handle resizing queries for a visual display by accessing one or more files containing stretching area properties. Consistent with embodiments, the stretching properties can be identified by a set of nodes that are linked to various elements in the visual display. The nodes can be associated with resizing rules that the system can access to determine how to perform the desired resizing. Particular aspects are directed toward the visual display being described in terms of different rendering layers, which the system can use to split the rendering of a resized visual display into different layers.

Particular embodiments are directed toward the use of a file with stretching area properties that are described using one or more data files (e.g., as opposed to dynamic instructions defined using software code like JavaScript®). For instance, Extensible Markup Language (XML) file(s) can be used to store resizing data that is then used to control how the visual display is rendered for various resizing requests. In particular instances, the XML files can store sets of nodes that identify locations on the visual display. Each set of nodes can be linked to different visual elements or components. The XML files can also include one or more rule sets that are linked to the sets of nodes and that specify resizing parameters that are referenced to the sets of nodes.

According to various embodiments, the use of nodes allows for rules for a visual display to be defined based upon a vector path that is drawn by a layout designer. Different rules can be assigned to each node and for vectors between each node. The rules can include element or node specific attributes (e.g., which portion to stretch and which portion to leave as is) as well as attributes between different elements (e.g., whether or not to maintain a particular distance between two elements).

Turning now to the figures, FIG. 1 depicts a block diagram for a system that provides resizing functions for visual displays associated with one or more services, consistent with embodiments of the present disclosure. Service developers may desire to create a visual display (e.g., a webpage or GUI) for a service that is to be provided to one or more service device users 102. As an example, an individual using the service developer system 112 may seek to design visual display for a website or a software application for service device users 102 and their different user devices 104, 106, 108. The different user devices 104, 106, 108 can each have different display sizes, image resolutions and other capabilities. As discussed herein, the user devices 104, 106, 108 can include a variety of computer-based devices with different display capabilities, screen sizes and other relevant aspects. For instance, the user devices can include various different types of mobile smart phones 104, a desktop computers 106 and tablet devices 108.

According to various embodiments, the visual display can include a number of different elements, which can be text, images, video, vector images, other media components and combinations thereof. As discussed herein, the various systems and devices can include one or more computer processor circuits that are configured to carry out the various functions discussed herein as well as providing the corresponding outputs and results.

Consistent with embodiments, the service and its visual display can be hosted on one or more servers that are part of a service provider system 120. The service provider system 120 can be accessed by the service developer system 112 and service device users 102 over one or more networks 110. For instance, a service developer may create a website design that is uploaded to the server of service provider 120 over network 110. Consistent with embodiments, the service developer system 112 may be part of the service provider system 120. Network 110 can include, but is not necessarily limited to, local area network(s) (LANs), wide area networks (WANs), the global Internet, proprietary networks, private networks and combinations thereof.

Aspects of the present disclosure allow a service developer to create a visual display that can be modified according to sets of resizing rules, some of which can be non-proportional stretching rules. For example, a rendering layer creation module 118 can be configured to allow a service developer to create rendering layers with resizing rules that can then be applied to an existing or new visual display. The resulting rendering layers 116 can be stored for subsequent uploading to a service provider system 120.

According to various embodiments, the resizing rules can be linked to set of nodes within the visual display. For instance, the rendering layer creation module 118 can provide a graphical interface that allows a service developer to add, create and place various elements within the visual display. The elements can include, but are not limited to, text, images, shapes and active or selectable items (e.g., buttons, drop-down menus, fillable forms). The rendering layer creation module 118 can further provide an option for the service developer to create and place nodes within the visual display. For instance, the rendering layer creation module 118 can include a node creation tool with a GUI that allows the service developer to see the visual display and select locations for placement of the nodes. The rendering layer creation module 118 can then generate a set of one or more data files that define the visual interface as well as the resizing rules. Particular embodiments are directed toward the use of XML file structure with a hierarchical set of rendering layers 116 for different aspects of the visual interface.

According to various embodiments, the service developer can directly edit or create the data (e.g., XML) files, which can be designed with a text-based format that is easily read and modified by an individual. This can be particularly useful for allowing the resizing rules of the visual display to be created or edited without requiring knowledge of coding with dynamic instructions that are defined using software code like JavaScript®.

In some embodiments, the service developer system 112 can be configured to provide a preview of a resized version of the visual display, i.e., resized according to the rendering layers and resizing rules 116. For instance, a resizing module 114 can be configured to respond to a resizing request from a service developer by accessing the rendering layers and resizing rules 116 and rendering a resized version of the visual display based upon the rules and the request. The resized version can then be shown to the service developer, who can adjust the rules and nodes if something in the display did not scale correctly. This resizing and reviewing process can be repeated for various different display sizes, resolutions, orientations, and other resizing options.

Consistent with some embodiments, the developer can use different devices, such as user devices 104, 106, 108, to preview resizing of the visual display. This facilitates review of the visual display on different platforms, screen sizes and devices. This may include, for example, using a touch screen capable device (e.g., tablet or phone) or even a wearable device (e.g., such as eyeglasses with display capabilities) to view the resized version of the visual display. The developer can then modify existing nodes or specify new nodes directly from the device. For example, the service developer system 112 can be configured to receive selection events from the device, whether for a touch screen device or from other input including, but not limited to, eye tracking, voice commands and gesture detection. For instance, a developer could touch an existing node and then drag it to a new location. The developer could also add or remove rules associated with one or more nodes. These inputs can then be used to update the corresponding rendering layers 116.

When the service developer decides that the visual display and rendering layers 116 are acceptable, they can be uploaded, or otherwise made available, to the service provider system 120. When one or more of the service user devices 102 requests content that includes the visual display, the service provider system 120 can determine the requested format corresponding to the requesting device. This can include information and parameters describing the requested screen size, resolution, and orientation. When the requested size does not match the default size of the visual display, the request serves as a resizing request.

Consistent with embodiments, the service provider system can be configured to respond to a resizing request by using a resizing module 122 to access a database 124 that can contain data for the visual display. In addition to content information (e.g., binary image data, text content, image formatting), the database 124 can store the rendering layers 126 and the corresponding resizing rules. The resizing module can apply the resizing rules to different layers of the visual display to modify various elements of the visual display. The result of the modification can include a version of the visual display that matches the resizing request while following the resizing rules specified in the rendering layers 126.

Figure 2:
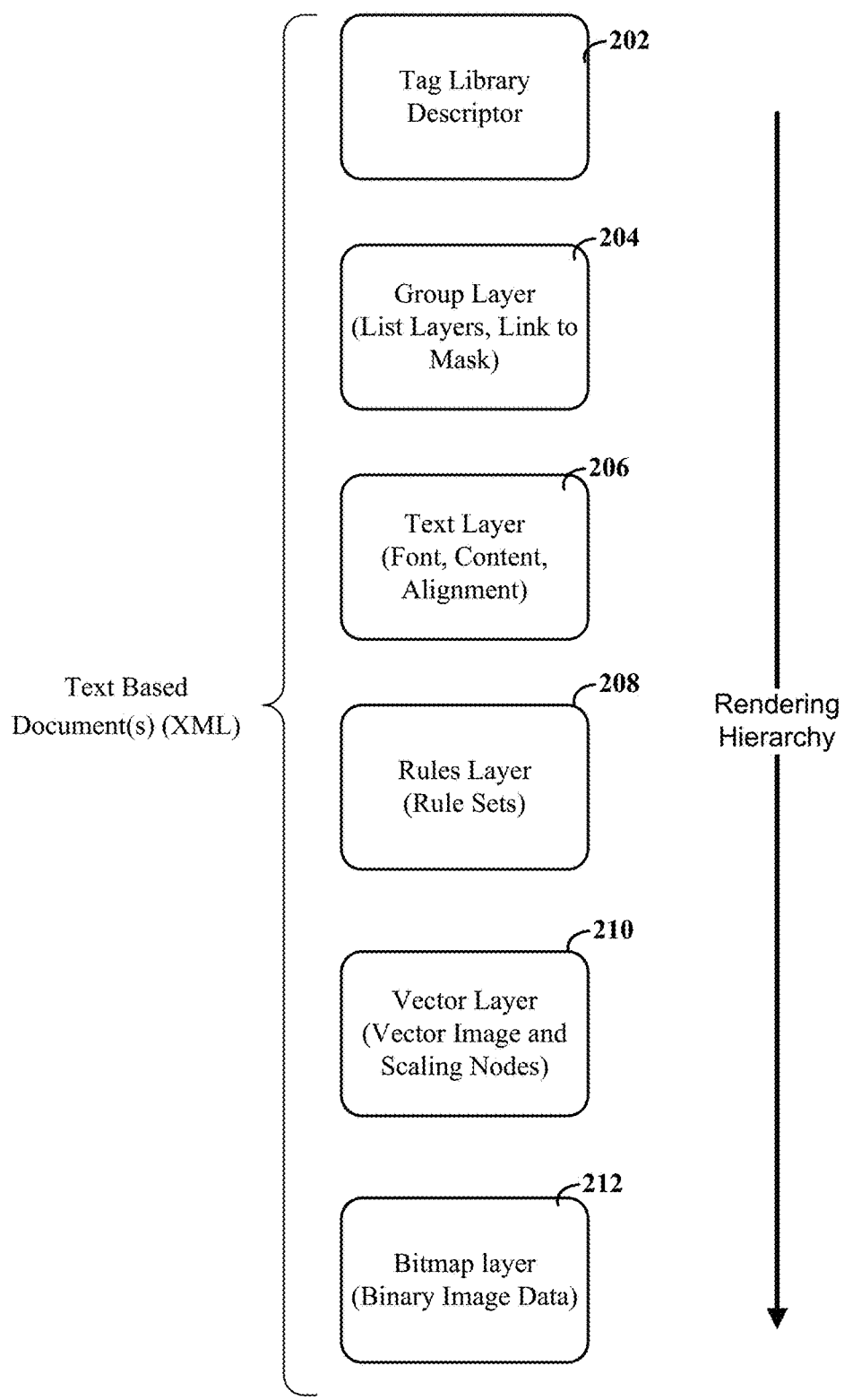
FIG. 2 depicts a block diagram of a rendering hierarchy structure that can be specified in one or more data files, consistent with embodiments of the present disclosure.

FIG. 2 depicts a block diagram of a rendering hierarchy structure that can be specified in one or more data files, consistent with embodiments of the present disclosure. Using one or more data files, a rendering layer creation module (e.g., as discussed in connection with FIG. 1) can be configured to create a hierarchical data structure that describes the visual display. In particular embodiments, the data structure can use an existing data structure framework to order the data, such as by placing the data in one or more XML files.

According to embodiments, the data structure can include a tag library descriptor (TLD) layer 202 that can serve as a container for objects that are part of the visual display. In some instance, the objects can include other data structures with a separate set of rendering layers. This allows for a single visual display to be constructed from multiple nested smaller visual display objects. Accordingly, in addition to information identifying the rendering layers, and the TLD layer 202 can identify other nested visual display objects.

Consistent with embodiments of the present disclosure, the TLD layer 202 can specify that the visual display is configured with layout descriptions for each layer and that are screen resolution independent (e.g., using virtual pixels). The TLD layer 202 can also specify the hit-testing capabilities for the visual display. For example, the TLD layer 202 can identify which elements or objects are active for registering a selection event, or a hit, by an end user of the visual display. This selection event can correspond to a selection event (e.g., touch event or a mouse/pointer selection) that is within the bounds of the corresponding object or element of the visual display.

Various embodiments allow for the data structure to include a group layer 204. The group layer 204 can include high-level description for the other layers and any associated groups of elements. The group layer 204 can also specify links to various masks for these layers. For example, a mask can be used to create composite elements by specifying portions of a masked element that are fully or partially transparent (e.g., based upon alpha-channel settings).

Consistent with embodiments of the present disclosure, the data structure can also include a text layer 206. The text layer 206 can include information about the text content as well as describe how the content is to be displayed. For instance, the text layer 206 can identify one or more fonts to use for different portions of the content. The text layer 206 might also include information about the alignment, justification and optional text path(s). Other examples of text information include fill properties (e.g., color) and stroke properties (e.g., opacity and texture). The list of possible text information is not exhaustive and can include other aspects such as kerning information or font sizes. In certain embodiments, the font rendering can be specified in the layer as being a vector based configurable rendering, which can also be platform independent.

Embodiments are directed toward a rules layer 208, which can include resizing rules. The rules layer 208 can also include various resizing parameters and rules, which can specify how the elements are resized relative to the various nodes. Aspects of the present disclosure are directed toward a data structure that includes a vector layer 210. The vector layer 210 can include links to a vector image for the visual display. The vector image provided in the XML format and can be included as separate XML document in the library as indicated by the TLD layer 202. In some instances, the vector image can be part of the same XML document as the rules layer or even in-lined. As discussed herein, the vector layer 210 can include sets of nodes that can be associated with different elements or objects of the visual display. The nodes can be defined using relative positions of the element as they exist before any resizing.

Embodiments of the present disclosure are directed toward the use of a coordinate system that is resolution and platform independent. This coordinate system can be used to specify node locations, text locations, rules and object or element locations. For example, the coordinate system can use virtual pixels (or density independent pixels) to identify locations and for measurement purposes. The virtual pixel can be converted to actual pixels based upon the specific/actual screen size. Thus, the ratio between virtual pixels and actual pixels can vary depending upon the scaling factor of the visual display. The virtual pixels can be used in the overall layout and in resizing rules. For instance, the virtual pixels can specify sizes, positions, offsets, percentages, or combinations thereof. As an example, a resizing rule for a container element can be based upon a default size of 100%×100% (width×length) and the rule can reference other container elements.

According to various embodiments, the coordinate system used for layout and resizing rules can use double floating point precision in the vector layers. The coordinate can then be rounded to the nearest actual/screen pixel when working with image files (bitmaps), which can be useful for reducing blurring.

Consistent with embodiments, the layout rules can specify paths of multiple nodes that can specify resizing rules relative to subsequent nodes and other portions of the image, such as specifying rules relative to container features. As an example, a path ("path1") can be made up of two (or more) nodes ("node1" and "node2") that have positional definitions relative to one another. The first node can be located 20 virtual pixels down from the top of a particular container and at a 10% value of the total width of the same container (relative to the left most edge). Thus, the vertical relative position from the top does not scale as the container is resized, but the horizontal position does. The second node can be located 10 vertical pixels to the down from the previous/first node and 10 horizontal vertical pixels to the left (with neither relative positions scaling). In addition, objects of certain shapes can be created and used with various rule sets. For example, a rectangular object could be created that has a height and width that is 30% of the container size and is positioned relative to the center of the container. An example positioning for the rectangular object can be to the left of the container center by 15% of the horizontal size and at the vertical center. An XML file format could be used define the path, nodes and resizing rules as follows:

```
<path id="path1" params="......">
    <pathnode id="node1" anchor="container:left-top" x="10%" y="20px"/>
    <pathnode id="node2" anchor="pathnode:node1" x="-10px" y="10px"/>
</path>
<rectangle id="rect2" anchor="container:center" width="30%" height="30%" x="-15%" y="0"/>
```

Rules can then be applied to these, and other, nodes and objects. The particular examples provided by these examples are not limiting and various embodiments allow for a variety of other paths, nodes, shapes and positions.

The data structure can also be configured to include a bitmap, or binary image, layer 212. This binary image layer can contain 9-slice information for the various bitmap images, as well as links to the bitmap image files. In particular embodiments, the bitmap image files can include mip-mapped versions of the image. Links can be established by referring to the desired image following a chosen naming convention. For example, there may be two version of the same image, each version having different resolutions. The NGI renderer can request the appropriate file by following a naming convention that corresponds to the desired resolution. As an example, a prefix or suffix can be added to a base image name: "gui.nice.button.background" or "gui.nice.button.background-hd," where the suffix "hd" indicates high definition and corresponding application level resolution settings. Consistent with embodiments the prefix or suffix can be designed with enough flexibility to support multiple resolutions (e.g., ×1, ×1.5, ×2).

Aspects of the present disclosure also allow for layer properties that are common between one or more layers. These properties can include, but are not necessarily limited to, definitions for elements relating to opacity, whether the element is visible at all, whether the element is active (e.g., part of the hit test), position (e.g., relative to the container), and size (e.g., a percentage of the container size). For instance, an XML file can include a section that stores such constants, or can refer to another XML file with these constants.

Figure 3:
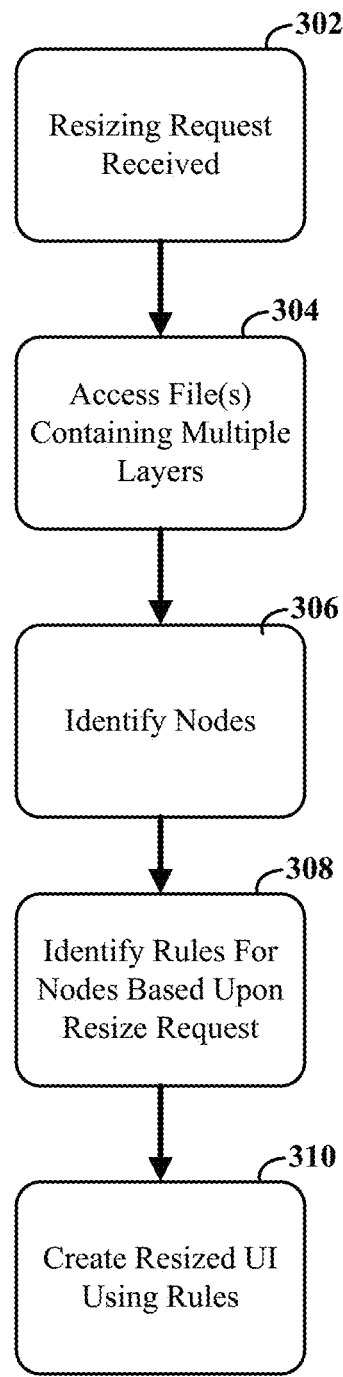
FIG. 3 depicts a flow diagram for generating a resized visual display, consistent with embodiments of the present disclosure.

FIG. 3 depicts a flow diagram for generating a resized visual display, consistent with embodiments of the present disclosure. According to embodiments, the flow can be carried out by a resizing module, such as the resizing modules discussed in connection with FIG. 1. A resizing request can be received, as shown by block 302. This may be a request for a visual display (e.g., a webpage) that is accompanied with a particular screen size and/or resolution. The resizing module can then access one or more files associated with various rendering layers of the visual display, as shown by block 304. These layers can include layers that have links to binary image data files for a plurality of visual elements used in the visual display. The layers can also specify a set of nodes that form a plurality of vector paths for at least one of the plurality of visual elements. One of the layers can include a set of rules defining different image resizing properties for different vector paths of the plurality of vector paths. In particular embodiments, the layers can be consistent with the layers discussed in connection with FIG. 2.

The resizing module can also be configured to identify the sets of nodes specified in the one or more files, per block 306. Each of these sets of nodes can be linked to a visual element from the visual display and referenced using a coordinate system. In particular embodiments, the coordinate system can be resolution independent (e.g., using virtual pixels as discussed herein). The resizing module can then identify one or more sets of rules associated with the sets of nodes, per block 308. The identified rules can then be applied to resize the visual display for the resizing request and its associated parameters, per block 310.

Consistent with various embodiments, the resizing module can be configured to resize the visual display by rendering at successively lower layers. For instance, groups of container elements and masks can be the first layer that is resized to fit a desired screen resolution and size. This resizing effort can include high level layout considerations (e.g., keeping text at a minimum size, maintaining a particular distance between two container elements, or differences in relative scaling percentages in various container elements or groups). The resizing module can then resize the text layer by, for example, changing font sizes, different text locations or modifying the text path. It is also possible to specify alternative text content for different scaling options (e.g., a reduced length of text content for smaller screen sizes or for certain resolutions). The resizing module can then render based upon vector images and sets of nodes. Finally, a binary, or bitmap, image layer can be rendered.

Figure 4:
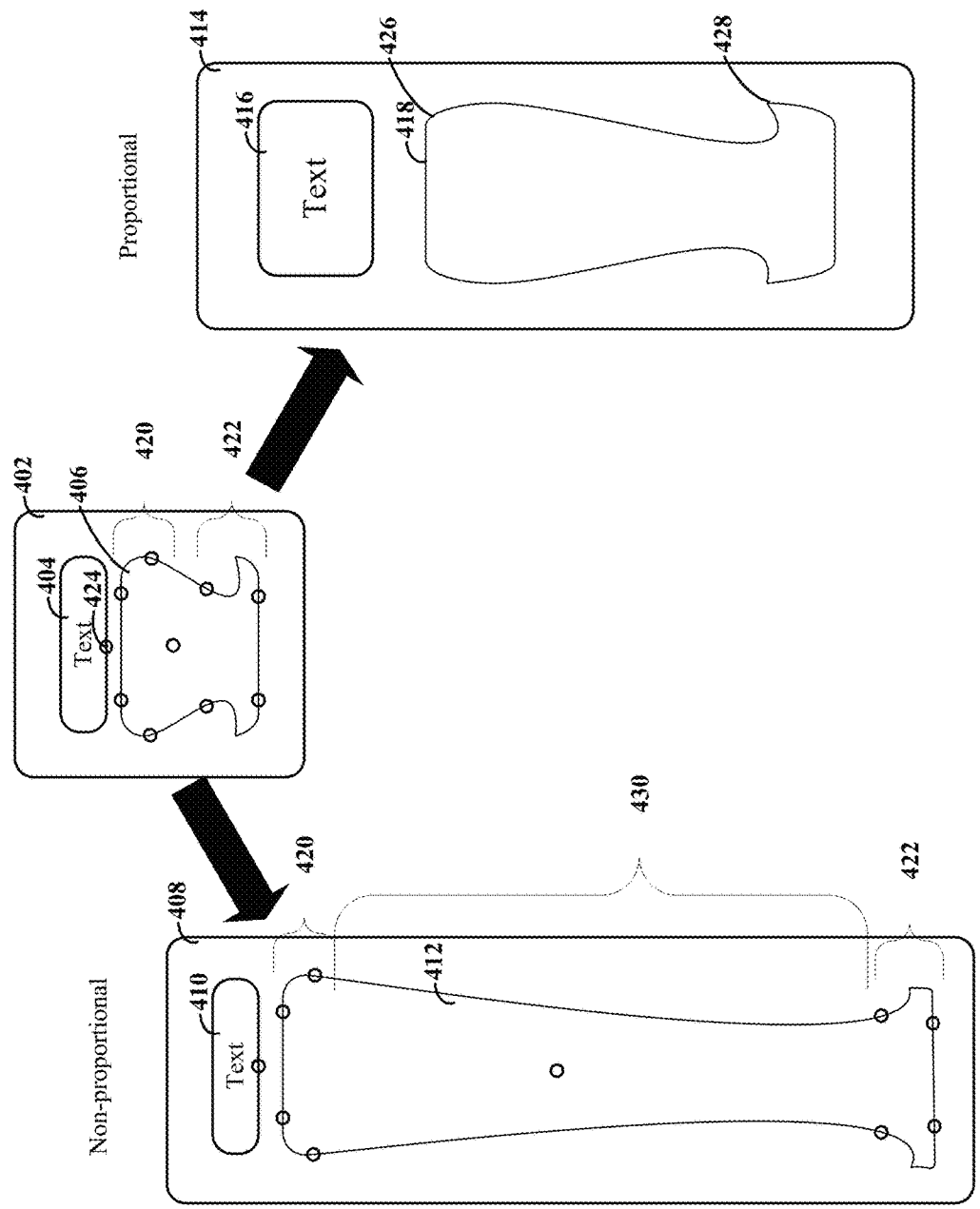
FIG. 4 depicts different resizing results of a visual display that has been resized, consistent with embodiments of the present disclosure.

FIG. 4 depicts alternative results of a visual display that has been resized, consistent with embodiments of the present disclosure. Visual display 402 can include two container elements 404 and 406. Container (text element) 404 is depicted as containing text, while container (graphic element) 406 is depicted as a graphic element. Consistent with embodiments a set of one or more data files (e.g., XML files) can describe the content and placement of the container elements and can also describe other parameters relevant to rendering the visual display 402. For instance, the data files can specify various nodes 420, 422, 424 and resizing rules associated with the nodes.

Visual displays 408, 414 represent results of resizing of the visual display 402. In particular, visual display 414 represents the results of proportional resizing (e.g., without the use of a layered data structure that specifies nodes and associated resizing rules). Visual display 408 represents the results of non-proportional resizing that can be achieved using data files with node-based rule sets. Proportional resizing, such as that shown by visual display 414, can cause issues. For instance, the text element 404 is shown as having been increased proportionally to the resized version 416. Moreover, spacing between the text element 404 and the graphic element 406 was also increased proportionally. The result is a visually unbalanced display with spacing that can detract from the content. Moreover, graphic element 406 includes a number of protrusions and corners that appear distorted when proportionally resized. For example, in the resized graphic element 418, the curved corner indicated by 426 can become distorted so that it no longer looks circular (as it appeared in the visual display 402). Similarly, the protrusion indicated by 428 can appear overly pronounced and otherwise distorted when proportionally stretched. A variety of other potential resizing issues are also possible.

Consistent with embodiments of the present disclosure, a data file can be used to define nodes which can be used as reference points for resizing rules of varying complexity. For example, a set of nodes 420, 422 can be used to identify corners and protrusions of the graphic element 406. A set of rules can specify how the graphic element resizes, relative to these nodes. For instance, the rules can specify that the exterior shape between the nodes should be preserved for resizing that includes vertical increases in screen size. The result is that the section (430) that is between these preserved portions is resized to accommodate the vertical increase. As shown in visual display 408, this can result in a graphic element 412 that maintains the visual aesthetic properties for the upper and lower sections corresponding to the corners and protrusions.

According to embodiments, the nodes can be used to apply rules that reference other elements and their nodes. For instance, a designer of the visual display 402 may want the text element 404 to stay within a particular distance of the graphic element 412. Accordingly, a rule can be added that specifies that node 424 remain within a certain distance vertical distance from a node of graphic element 406. As shown in visual display 408, the resulting text element 410 can be kept near the graphic element 412.

The particular rules, nodes and elements discussed in connection with FIG. 4 are presented as examples. A wide variety of other options are possible, including much more complex rule sets with additional interdependencies between container elements and other nodes.

Figure 5:
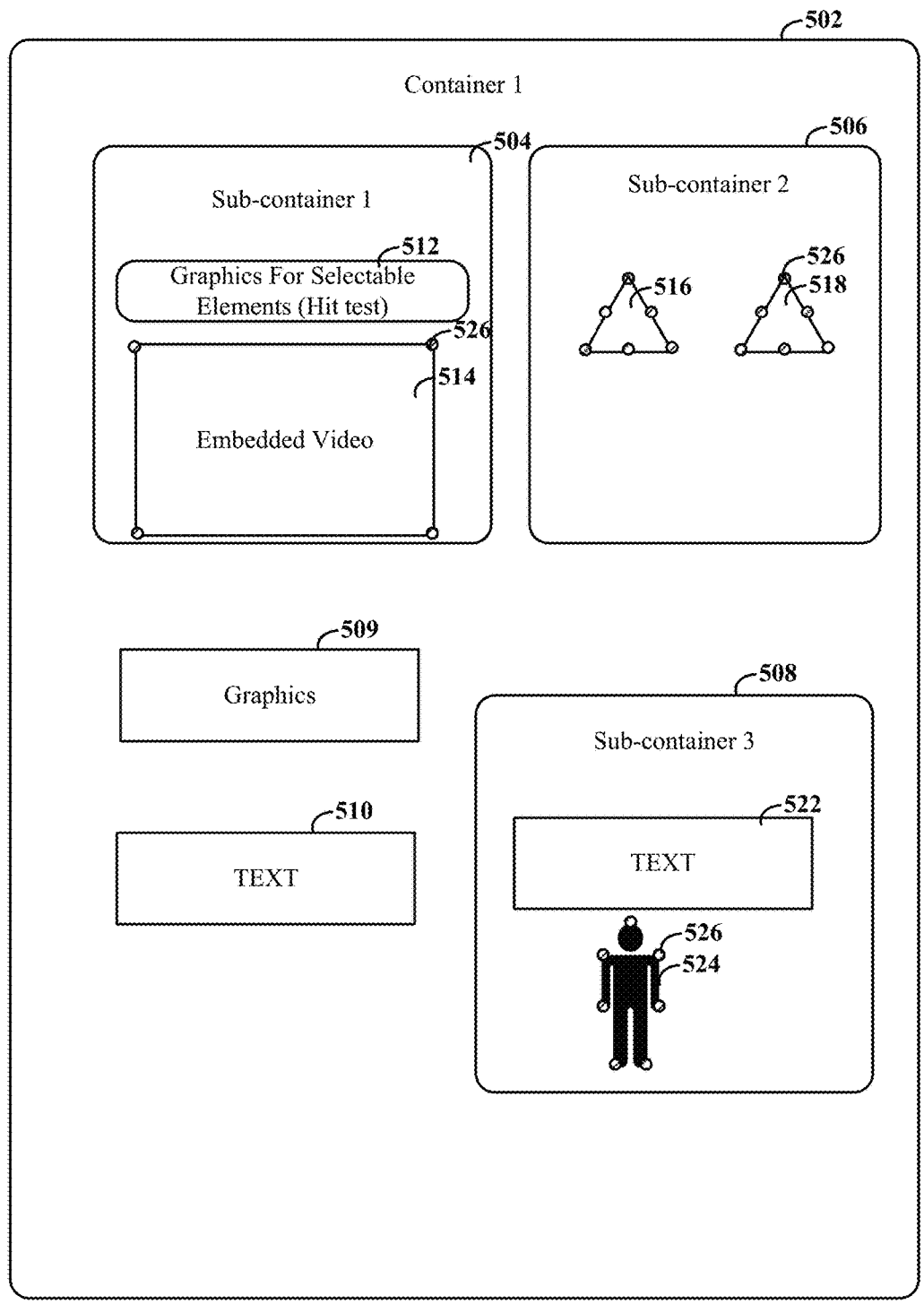
FIG. 5 depicts a visual display with a plurality of nested containers, consistent with embodiments of the present disclosure.

FIG. 5 depicts a visual display with a plurality of nested containers, consistent with embodiments of the present disclosure. Consistent with various embodiments, the data structure can allow for nested containers in which a container defined by a first set of rendering layers can hold additional containers with respective and different sets of rendering layers. As shown in FIG. 5, a first container 502 can include elements, such as graphics and text elements 509, 510. These elements can be defined in the appropriate layers. Consistent with embodiments, the first container 502 can also include additional containers 504, 506, 508, which can also defined by a set of rendering layers. For instance, container 504 is depicted as including a container with selectable graphics 512 (to be included in a hit test) and an embedded video clip 514. Container 506 is depicted as including graphic elements 516, 518, and container 508 is depicted as including a text element 522 and graphic element 524.

According to embodiments, one or more of the various elements can be associated with sets of nodes 526. Sets of resizing rules can be provided in connection with the various elements, containers and nodes.

Figure 6:
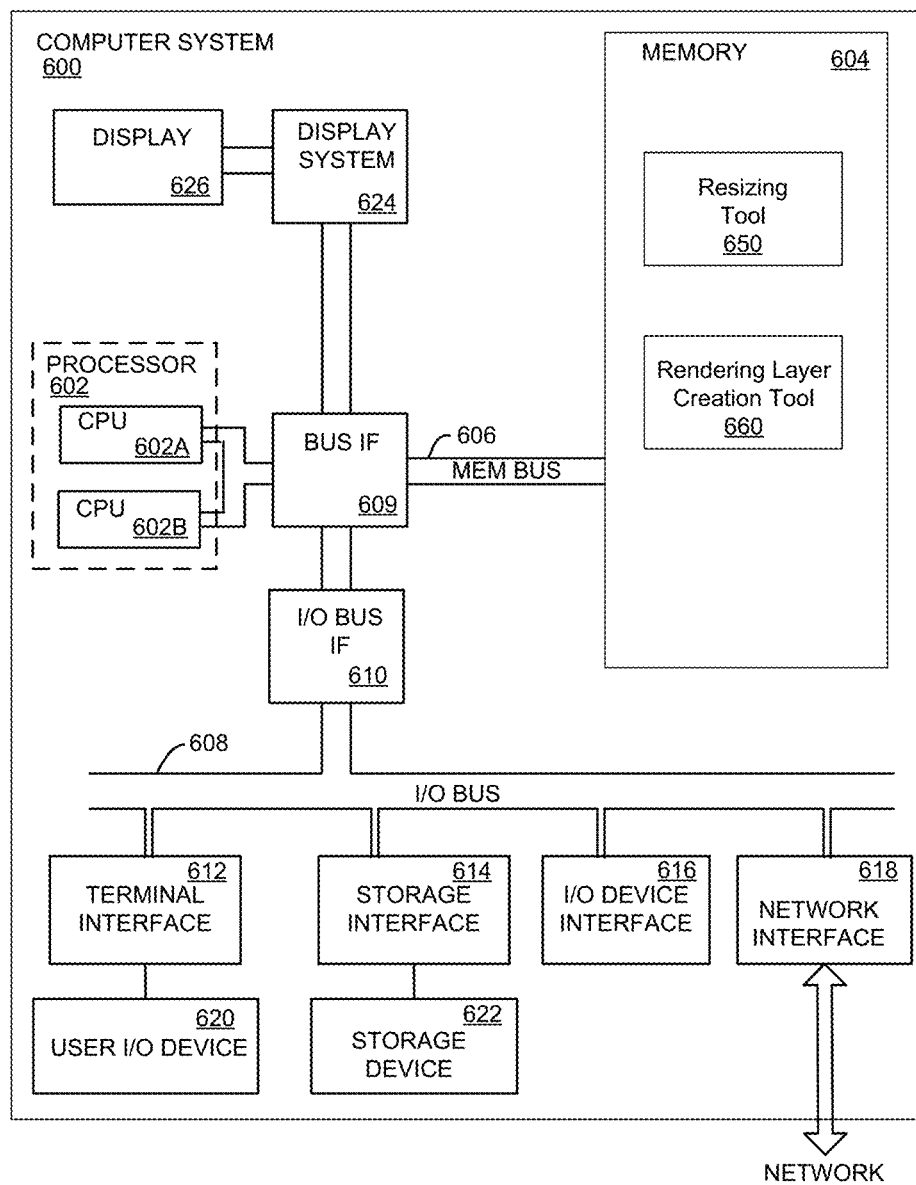
FIG. 6 depicts a high-level block diagram of a computer system, consistent with various embodiments of the present disclosure.

FIG. 6 depicts a high-level block diagram of a computer system 600 consistent with various embodiments of the present disclosure. The mechanisms and apparatus of the various embodiments disclosed herein apply equally to any appropriate computing system. The major components of the computer system 600 include one or more processors 602, a memory 604, a terminal interface 612, a storage interface 614, an I/O (Input/Output) device interface 616, and a network interface 618, all of which are communicatively coupled, directly or indirectly, for inter-component communication via a memory bus 606, an I/O bus 608, bus interface unit 609, and an I/O bus interface unit 610.

The computer system 600 may contain one or more general-purpose programmable central processing units (CPUs) 602A and 602B, herein generically referred to as the processor 602. In embodiments, the computer system 600 may contain multiple processors; however, in certain embodiments, the computer system 600 may alternatively be a single CPU system. Each processor 602 executes instructions stored in the memory 604 and may include one or more levels of on-board cache.

In embodiments, the memory 604 may include a random-access semiconductor memory, storage device, or storage medium (either volatile or non-volatile) for storing or encoding data and programs. In certain embodiments, the memory 604 represents the entire virtual memory of the computer system 600, and may also include the virtual memory of other computer systems coupled to the computer system 600 or connected via a network. The memory 604 can be conceptually viewed as a single monolithic entity, but in other embodiments the memory 604 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 604 may store all or a portion of the various programs, modules and data structures for processing data transfers as discussed herein. For instance, the memory 604 can store resizing tool or module 650 and/or rendering layer creation tool or module 660. Consistent with certain embodiments, these tools can be implemented as part of one or more monitor threads. These programs and data structures are illustrated as being included within the memory 604 in the computer system 600, however, in other embodiments, some or all of them may be on different computer systems and may be accessed remotely, e.g., via a network. The computer system 600 may use virtual addressing mechanisms that allow the programs of the computer system 600 to behave as if they only have access to a large, single storage entity instead of access to multiple, smaller storage entities. Thus, while the resizing tool 650 and the rendering layer creation tool 660 are illustrated as being included within the memory 604, these components are not necessarily all completely contained in the same storage device at the same time. Further, although the resizing 650 and the rendering layer creation tool 660 are illustrated as being separate entities, in other embodiments some of them, portions of some of them, or all of them may be packaged together (e.g., as part of the same monitor thread).

In embodiments, the resizing tool 650 and the rendering layer creation tool 660 may include instructions or statements that execute on the processor 602 or instructions or statements that are interpreted by instructions or statements that execute on the processor 602 to carry out the functions as further described below. In certain embodiments, the resizing tool 650 and the rendering layer creation tool 660 can be implemented in hardware via semiconductor devices, chips, logical gates, circuits, circuit cards, and/or other physical hardware devices in lieu of, or in addition to, a processor-based system. In embodiments, the resizing tool 650 and the rendering layer creation tool 660 may include data in addition to instructions or statements.

The computer system 600 may include a bus interface unit 609 to handle communications among the processor 602, the memory 604, a display system 624, and the I/O bus interface unit 610. The I/O bus interface unit 610 may be coupled with the I/O bus 608 for transferring data to and from the various I/O units. The I/O bus interface unit 610 communicates with multiple I/O interface units 612, 614, 616, and 618, which are also known as I/O processors (IOPs) or I/O adapters (IOAs), through the I/O bus 608. The display system 624 may include a display controller, a display memory, or both. The display controller may provide video, audio, or both types of data to a display device 626. The display memory may be a dedicated memory for buffering video data. The display system 624 may be coupled with a display device 626, such as a standalone display screen, computer monitor, television, or a tablet or handheld device display. In one embodiment, the display device 626 may include one or more speakers for rendering audio. Alternatively, one or more speakers for rendering audio may be coupled with an I/O interface unit. In alternate embodiments, one or more of the functions provided by the display system 624 may be on board an integrated circuit that also includes the processor 602. In addition, one or more of the functions provided by the bus interface unit 609 may be on board an integrated circuit that also includes the processor 602.

The I/O interface units support communication with a variety of storage and I/O devices. For example, the terminal interface unit 612 supports the attachment of one or more user I/O devices 620, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 620 and the computer system 600, and may receive output data via the user output devices. For example, a user interface may be presented via the user I/O device 620, such as displayed on a display device, played via a speaker, or printed via a printer.

The storage interface 614 supports the attachment of one or more disk drives or direct access storage devices 622 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 622 may be implemented via any type of secondary storage device. The contents of the memory 604, or any portion thereof, may be stored to and retrieved from the storage device 622 as needed. The I/O device interface 616 provides an interface to any of various other I/O devices or devices of other types, such as printers or fax machines. The network interface 618 provides one or more communication paths from the computer system 600 to other digital devices and computer systems; these communication paths may include, e.g., one or more networks 630.

Although the computer system 600 shown in FIG. 4 illustrates a particular bus structure providing a direct communication path among the processors 602, the memory 604, the bus interface 609, the display system 624, and the I/O bus interface unit 610, in alternative embodiments the computer system 600 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 610 and the I/O bus 608 are shown as single respective units, the computer system 600 may, in fact, contain multiple I/O bus interface units 610 and/or multiple I/O buses 608. While multiple I/O interface units are shown, which separate the I/O bus 608 from various communications paths running to the various I/O devices, in other embodiments, some or all of the I/O devices are connected directly to one or more system I/O buses.

In various embodiments, the computer system 600 is a multi-user mainframe computer system, a single-user system, or a server computer or similar device that has little or no direct user interface, but receives requests from other computer systems (clients). In other embodiments, the computer system 600 may be implemented as a desktop computer, portable computer, laptop or notebook computer, tablet computer, pocket computer, telephone, smart phone, or any other suitable type of electronic device.

FIG. 6 depicts a representative of certain major components of the computer system 600. Individual components, however, may have greater complexity than represented in FIG. 4, components other than or in addition to those shown in FIG. 4 may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different manners, including using various computer applications, routines, components, programs, objects, modules, data structures, etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
a memory and a processor configured to:
receive a resizing request for a touch screen user interface that includes parameters for resizing a plurality of visual elements presented on the touch screen user interface including a first textual element and a second graphical element located in a container comprising a rectangle having a container height based on a screen size, a screen resolution, and a screen orientation of the touch screen user interface, a container length based on the screen size, the screen resolution, and the screen orientation of the touch screen user interface, and a container center, wherein parameters for resizing comprise an updated screen size, an updated screen resolution, and an updated screen orientation of the touch screen user interface;
wherein the first textual element comprises a rectangle having a first height that is 30% of the container height and a first width that is 30% of the container width, wherein the first textual element is located at a 15% left horizontal offset of the container center such that a center of the first textual element is located a number of horizontal pixels left of the container center corresponding to 15% of a number of pixels of the container length;
wherein the second graphical element is defined by at least a first node and a second node;
wherein the first node is located 20 vertical pixels below a top edge of the container and at a 10% right offset from a left edge of the container, wherein the 10% right offset comprises a number of pixels corresponding to 10% of the container length;

wherein the second node is located 10 vertical pixels below the first node and 10 horizontal pixels left of the first node;

access, in response to the resizing request, one or more Extensible Markup Language (XML) files, wherein a respective XML file of the one or more XML files contains a tag library descriptor (TLD) that identifies multiple layers for the user interface, wherein each respective layer comprises layout information for one or more visual elements of the plurality of visual elements, wherein the layers include:

a binary image layer containing links to respective binary image data files for respective visual elements, wherein the respective binary image data files further comprise respective mip-mapped bitmaps of the respective binary image data files such that a first mip-mapped bitmap stores information for the plurality of visual elements based on the updated screen resolution, and wherein the first mip-mapped bitmap is stored according to a naming convention containing a suffix indicating the updated screen resolution;

a vector layer describing positional information for respective visual elements, wherein positional information comprises respective positions of respective nodes of a respective set of nodes forming a plurality of vector paths for each respective visual element, wherein respective positions of respective nodes of respective sets of nodes are defined by a coordinate system of virtual pixels, wherein the virtual pixels are resolution independent; and a resizing layer containing respective sets of resizing rules for respective visual elements, wherein respective resizing rules in a respective set of resizing rules for a respective visual element are based on respective vector paths for a respective set of nodes corresponding to a respective visual element;

identify, based on the vector layer of the TLD, respective paths of nodes corresponding to respective visual elements in the user interface;

identify, based on the resizing layer of the TLD and the parameters for resizing, respective resizing rules for respective paths of nodes corresponding to respective visual elements in the touch screen user interface; and create a resized version of the touch screen user interface by modifying the plurality of visual elements according to the identified resizing rules and to the parameters for resizing;

wherein the container is resized based on the updated screen size, the updated screen resolution, and the updated screen orientation to form a resized container comprising a resized rectangle having an updated container length and an updated container width and an updated container center;

wherein the first textual element is resized such that the resized first textual element comprises a rectangle having a resized first height that is 30% of the updated container height and a resized first width that is 30% of the updated container width, wherein the first textual element is located at a 15% left horizontal offset of the updated container center such that a center of the resized first textual element is located a number of horizontal pixels left of the updated container center corresponding to 15% of a number of pixels of the updated container length;

wherein the second graphical element is resized such that the resized second graphical element is defined by an updated first node and an updated second node;

wherein the updated first node is located 20 vertical pixels below a top edge of the resized container and at a 10% right offset from a left edge of the resized container, wherein the 10% right offset comprises a number of pixels corresponding to 10% of the updated container length;

wherein the updated second node is located 10 vertical pixels below the updated first node and 10 horizontal pixels left of the updated first node;

wherein a first portion of respective visual elements are modified using a percentage of a respective original visual element size for a respective visual element in the user interface;

wherein a second portion of respective visual elements are modified using a virtual pixel value offset between a first node and a second node of a respective original path of nodes and a first node and a second node of a resized path of nodes for a respective visual element; and wherein a third portion of respective visual elements are modified using a virtual pixel offset relative to another visual element of the user interface.

* * * * *